Figure 1:
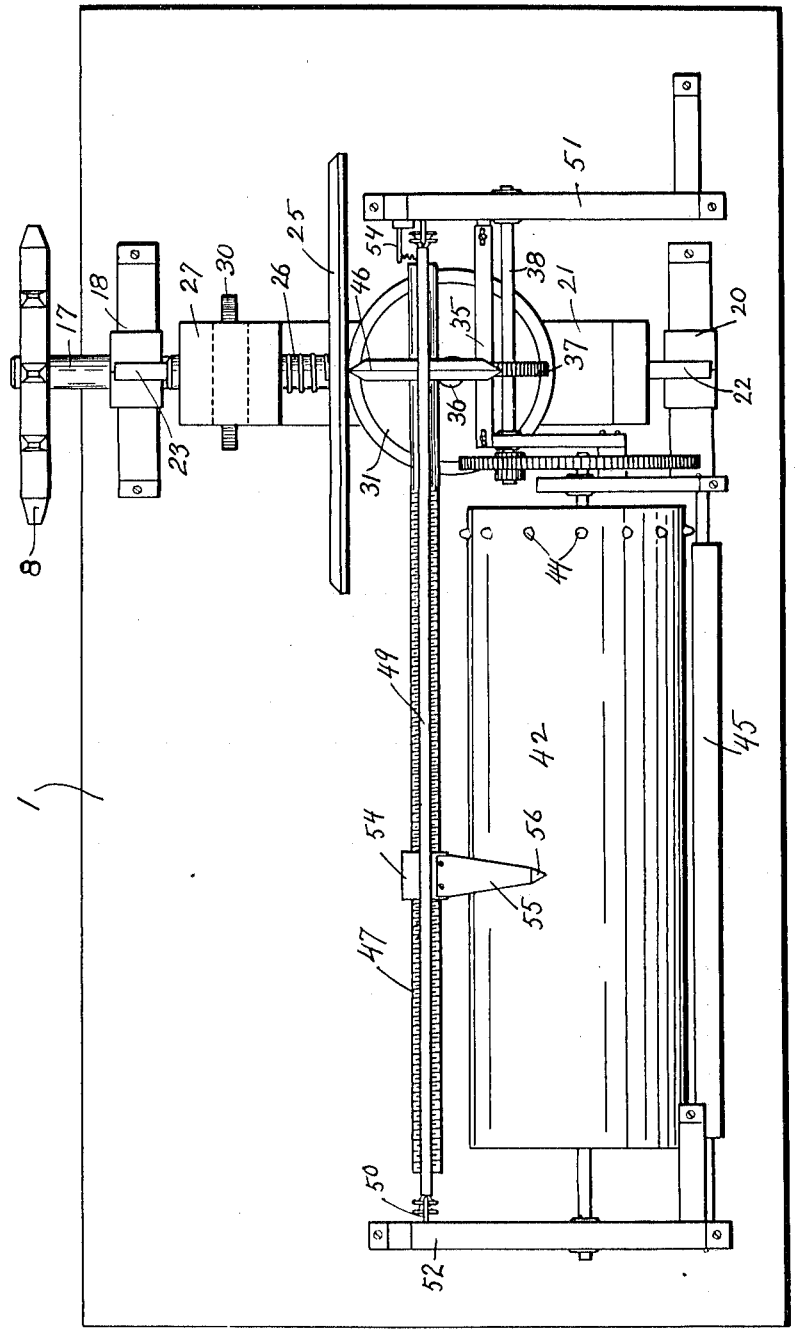

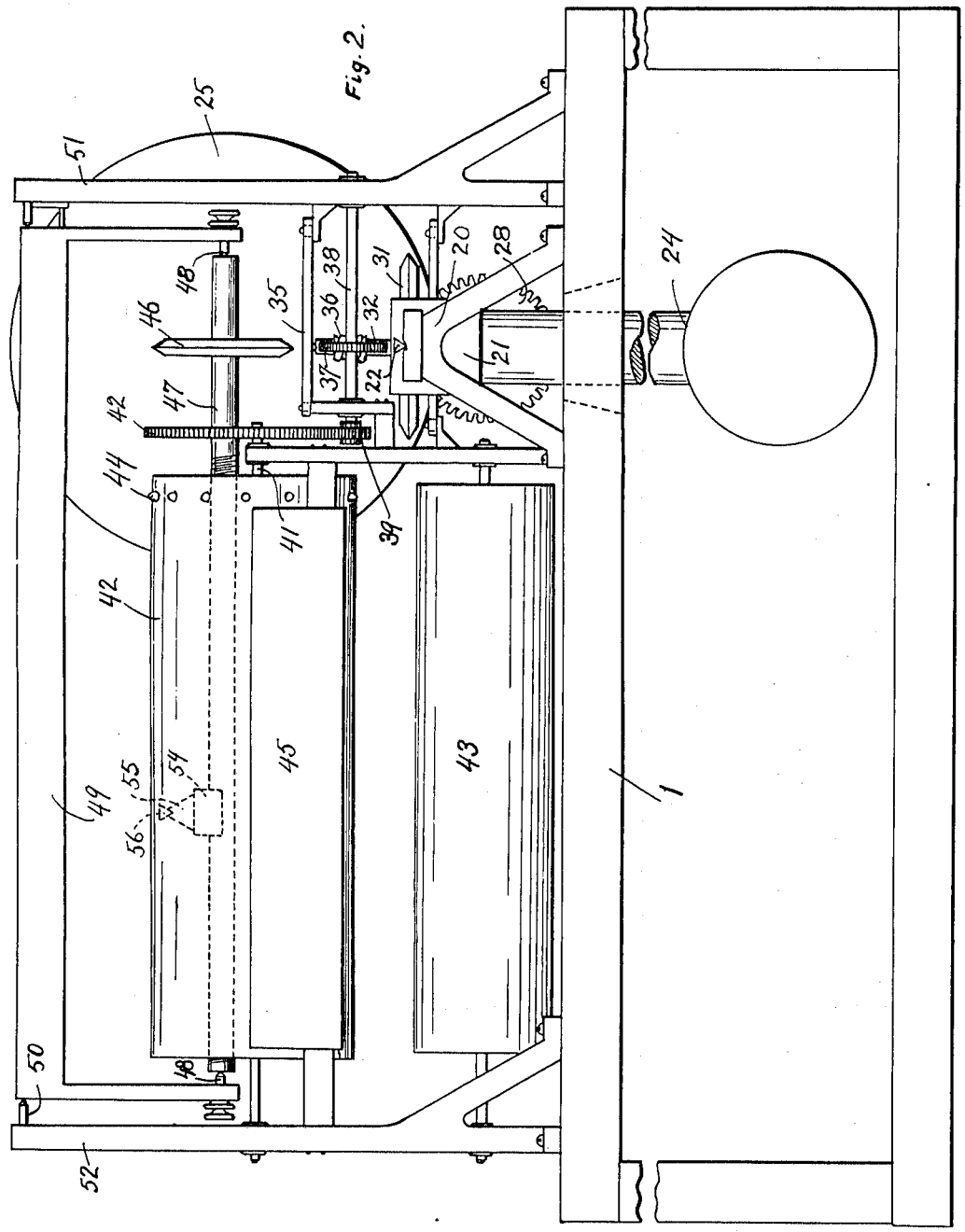

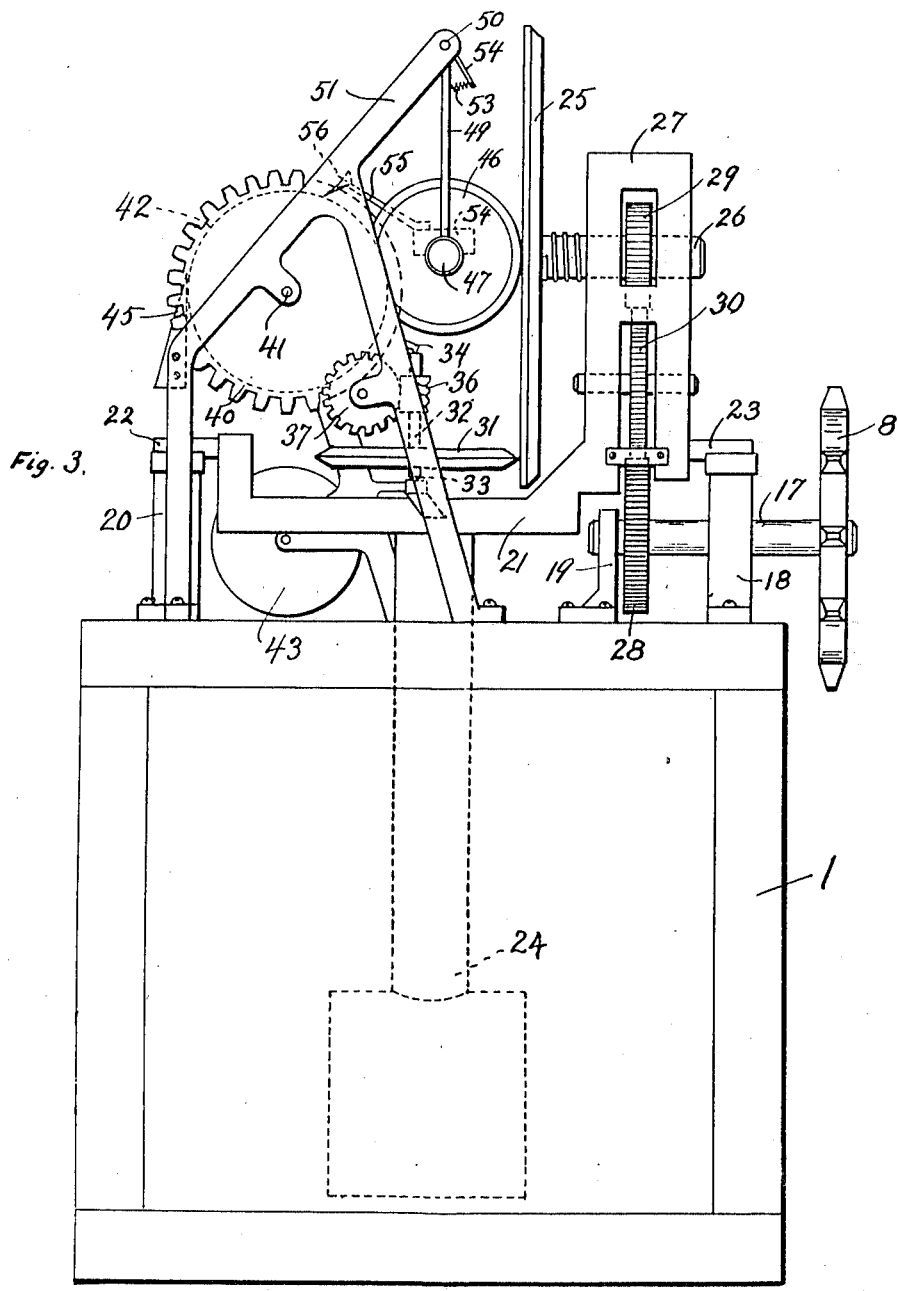

V. BUSH.
PROFILE TRACER.
APPLICATION FILED FEB. 2. 1912
1,048,649.
Patented Dec. 31, 1912.
4 SHEETS—SHEET 4.
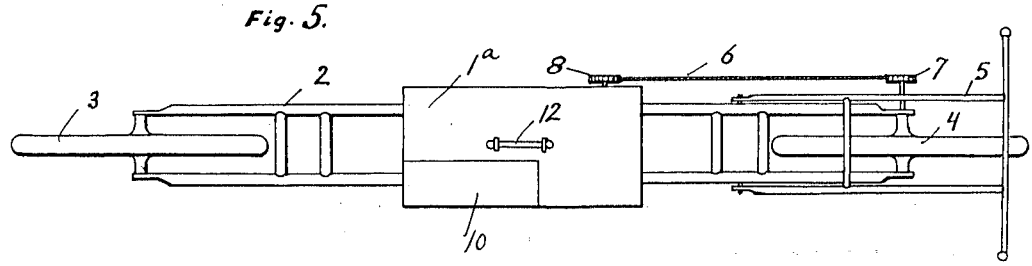
Fig. 5.
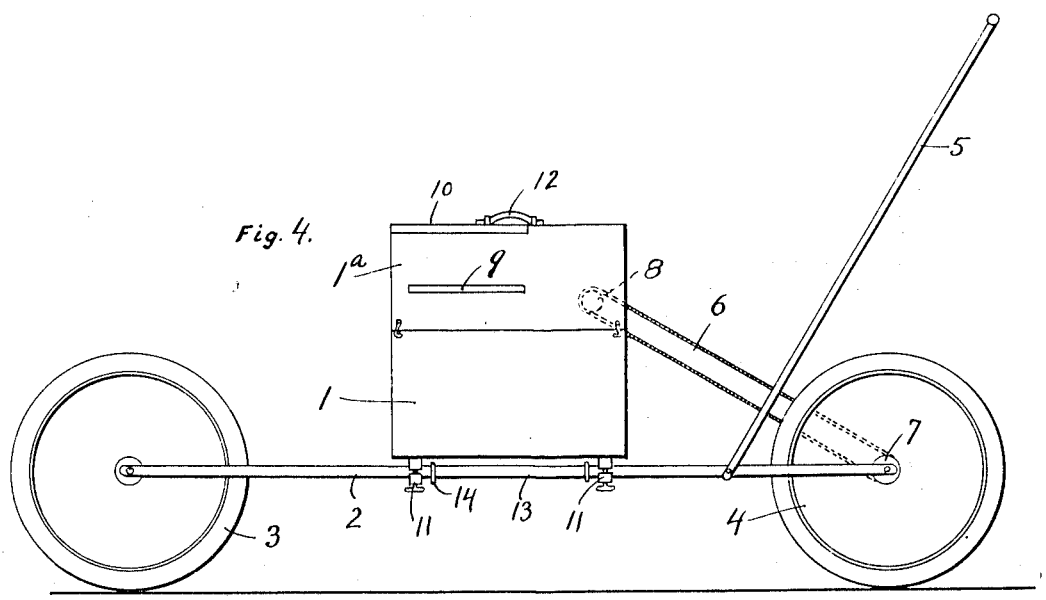
Fig. 4.
Fig. 6.
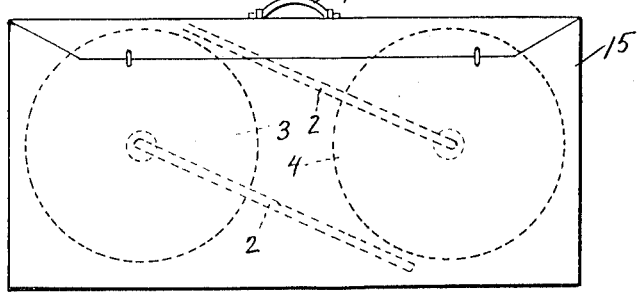
Witnesses.
L. E. Thacher
A. W. Quennell.
Inventor.
Vannevar Bush

UNITED STATES PATENT OFFICE.

VANNEVAR BUSH, OF CHELSEA, MASSACHUSETTS.

PROFILE-TRACER.

1,048,649.   Specification of Letters Patent.   Patented Dec. 31, 1912.

Application filed February 2, 1912. Serial No. 674,980.

*To all whom it may concern:*

Be it known that I, VANNEVAR BUSH, a citizen of the United States, and resident of Chelsea, in the county of Suffolk and State of Massachusetts, have invented certain new and useful Improvements in Profile-Tracers, of which the following is a specification.

This invention relates to an instrument adapted to be used in surveying for drawing a line upon a record sheet representing the elevations of successive points in a line extending across a strip of ground.

In surveying work, particularly surveys of railroads and continuous lines it is customary to prepare profiles of the country along lines to the transverse direction of the road at suitable intervals.

The purpose of the invention is to provide an instrument which will trace the superficial outlines of such profiles quickly and with approximate accuracy, which is automatic and capable of recording elevations of all points along the line on which the profile is taken with greater exactness than is obtainable by the usually practised methods of surveying, except by expenditure of much time and labor.

My main object in developing the present invention has been to secure accuracy.

A secondary object has been to produce an apparatus which is not only accurate, but is exceedingly simple in construction and has slight liability to derangement.

The manner in which I have accomplished these objects is disclosed in the following specification, wherein I have described and illustrated an instrument embodying the essential principles of the invention.

In the drawings forming a part of this application,—Figure 1 is a plan view of such an instrument, Fig. 2 is a side elevation of the same, Fig. 3 an end elevation as seen from the right of Fig. 2, Fig. 4 is an elevation of the carriage on which the instrument is mounted when in use, with the instrument thereon, Fig. 5 is a plan view of the same, Fig. 6 is a view showing in plan and elevation a case in which the carriage may be placed and representing the manner in which the carriage may be contained in such case.

The same reference characters indicate the same parts in all figures.

I will first describe the combination of the instrument with its carriage, and the mode of use of the same, and then describe the details of the instrument itself.

The recording sheet, the tracing point and the mechanism for proportionately moving the same are contained in a case 1 which is mounted upon a carriage consisting of a frame 2 and wheels 3, and 4, such wheels being journaled upon parallel axes at opposite ends of the frame and arranged in the same plane. Adjustably connected with the frame is a handle 5 by which the machine may be propelled. Motion is transmitted to the mechanism (hereinafter described) within the case from one of the wheels of the carriage, conveniently by means of a chain 6 passing over a sprocket 7 on a shaft of the wheel 4 and over a sprocket 8 connected to a shaft which projects from the side of the case and is connected with the mechanism within the latter. The case is conveniently made in two parts of which the bottom part is a box providing a space for swinging of the pendulum (hereinafter described) and is also a base supporting the mechanism of the instrument. The upper part 1ª of the case incloses the mechanism and is removable to give access thereto. It has a slot 9 in its side through which the record sheet is delivered, and a transparent plate 10 in its top through which the operation of the marking point may be observed. It is detachably secured to the frame 2 by means of clamps 11 and has a handle 12 by which it may be carried when disconnected from the carriage.

The frame of the carriage preferably consists of two pairs of parallel tubes suitably braced as shown in Fig. 5, which are held in alinement with one another by intermediate connector bars or tubes 13 and by the clamps 11. Such connector tubes or bars have shoulders 14 near their ends and enter telescopically the end tubes as far as framed by these shoulders. When thus connected the bars are held together by the clamps on the case 1. The handle 5 may be disconnected from the frame and the parts of the latter taken apart and packed with the handle in the case 15 shown in Fig. 6, which also has a handgrip 16. Thus all the parts of the instrument and its carriage may be contained in two cases of such slight size and weight that they may be easily transported by one man.

Figs. 1, 2, and 3 show the instrument on a larger scale, representing it as it appears mounted upon the bottom part of the case and with the top 1ª thereof removed. The sprocket wheel 8 previously mentioned is secured upon a shaft 17 having a bearing in a support 18 through which it passes and another bearing in a post 19. The support 18 and post 19 are contained within the parts which are inclosed in a removable top part of the case. Another support 20 is provided near the opposite side of the case. On the supports 18 and 20 rests a frame 21 having knife edge bearings 22 and 23. A weighted arm or pendulum 24 extends downwardly from the frame 21 into the bottom part of the case 1 carried by the frame. Above the knife edges is a disk 25 secured to a shaft 26 which has its bearing in an upwardly extending arm of the frame. Shafts 17 and 26 are in geared relation by means of gear wheels 28 and 29 mounted upon them respectively. The gears might be in direct mesh but for convenience of construction I provide an intermediate idler also pivoted on the extension of the frame. These gears transmit the motion derived from the travel of the supporting carriage to the disk 25. The latter transmits motion for feeding the record sheet and the marking point, and for that reason I have termed it a motor disk.

Engaging the face of the motor disk is a wheel 31 which has a staff 32 supported between needle point bearings 33 and 34, the latter of which is carried by a bar 35 which is perpendicular to the staff 32 and is adjustable lengthwise. On the staff 32 is a worm 36 meshing with a worm wheel 37 on a shaft 38. On said shaft is fixed a pinion 39 which meshes with a wheel 40 secured to the shaft 41 of a drum 42. Said drum constitutes a bed or platen which supports and feeds a record sheet. The shaft 41 is supported in suitable frames rigidly mounted upon the bottom part of the case 1. The recording sheet is supplied from a roll 43 beneath the drum 42 and is led from such roll around the drum. Preferably the sheet is perforated near one or both ends by holes spaced so as to receive projections 44 from the frame, whereby the sheet is positively fed. On leaving the drum the sheet passes over a stationary deflector 45 and out through the slot 9 in the case previously mentioned.

A second wheel 46 makes frictional contact with the motor disk 25. This wheel is secured upon a threaded shaft 47 which turns upon adjustable needle point bearings 48 carried by the arms of a frame 49 which is hung upon similar bearings 50 on uprights 51 and 52. A spring 53 is engaged with the frame 49 and with a stationary arm 54 secured in one of these uprights and holds the wheel 46 with a light but sufficient pressure against the motor disk. The function of the spring is merely to prevent the wheel 46 from swinging away from the disk rather than to cause the wheel to exert any pressure. Resting upon the screw shaft 47 is a half nut 54ª which meshes with the threads of the shaft and carries an arm 55 having a tracing point 56. The latter may be any of the fountain pens commonly used in recording instruments, or it may be any other suitable sort of marking instrument.

The case carrying the parts last above described is mounted upon the carriage frame in such a way that the axis of the knife edges 22 and 23 is perpendicular to the length of the carriage and therefore to the direction of progress of the carriage when the same is in use. The face of the motor disk 25 is in a plane perpendicular to the axis. Therefore the pendulum and disk are adapted to swing in a plane coincident with or parallel to the direction of progress of the carriage when either of the supporting wheels of said carriage is elevated higher than the other, as when ascending or descending slopes. The relation between the wheels 31 and 46 and the disk 25 is such that when the instrument and its carriage are on level ground, the wheel 31 is in a plane perpendicular to the plane of the disk 25 and also to the radius of such disk passing through the point of contact. Thereby when the machine is put in motion the paper drum is driven at the maximum speed. The wheel 46, however, is so placed that when the motor disk is in the position above mentioned no rotation is transmitted to it. This effect is secured by locating the wheel in a plane perpendicular to the disk and including that diameter of the same which intersects the axis of the knife edges. The point in this diameter at which contact occurs is immaterial so far as theoretical accuracy is concerned, because any point of contact anywhere along such a line travels perpendicularly to the wheel with no tendency to rotate it.

For practical considerations and in order to reduce wear to the least possible amount, I prefer to locate the wheel so that it makes contact with the disk at the exact center thereof. Accordingly in the embodiment of the invention which I have shown the wheel is located in a vertical plane perpendicular to the plane of the disk, and the screw shaft 47 thus extends parallel with the line of formal progress of the machine.

Supposing now that the machine encounters a sloping piece of ground. One of the wheels of the carriage is then elevated above the other, and the pendulum 24 in order to maintain its vertical position swings about the knife edges and thereby swings the frame carrying the disk 25. Attention is called to the fact that the pitch line contact between the gear 28 which is fastened to the case, and the gear 30 which is carried by the swinging frame, is in the line of the knife edge axis; hence this swinging of the frame about this axis has no tendency to rotate the gears and the disk 25. The tooth curves of the gears 28 and 30 are involute, and the intermeshed gears are at their maximum separation when the instrument is in the horizontal position. The only effect due to swinging of the frame is to bring the teeth into slightly closer mesh without altering in the slightest the even action of the gear train. Another point to be noted is that the point of contact between the motor disk and the wheel 31 is also on the same line, that is, in the axis of swinging of the frame 21. Thus such swinging of the frame produces only a variation in the angular relation between the wheel 31 and the disk 25 without relative linear movement and therefore without the necessity of overcoming friction. There is a displacement of the disk 25 bodily with relation to the wheel 46 when such swinging occurs, but this is the only point in which any rubbing takes place, and the friction is so slight as to be negligible. It would be possible, and is within my contemplation and the scope of this invention, to place the wheel 46 so that its point of contact is also in the axis of swinging, so that if desirable even this slight friction may be eliminated, but as the friction due to this cause has no effect on the accuracy of the instrument, I prefer to mount the wheel 46 in the position shown and described for the reason heretofore stated. The displacement of the disk relatively to this last mentioned wheel from the cause stated brings a point on the disk which has some linear motion in a direction other than perpendicular to the plane of the wheel, into contact therewith. Thus when the machine travels on a slope the wheel 46 is rotated and the marking point caused to travel over the paper which is proportional to the rate of turning of the motor disk (which latter is proportional to the speed of the machine as a whole and the distance passed over) and to the sine of the angle of inclination, that is, to the vertical distance through which the machine rises or descends in traversing the slope. Owing to the angular displacement of the motor disk relatively to the wheel 31, the plane of the latter is no longer perpendicular to the radius at the point of contact and so the disk is caused to slip to some extent past the wheel while turning the latter and at a reduced speed. Speed of this wheel, and therefore the rate of feeding of the paper is proportional to the co-sine of the angle of inclination, that is, to the horizontal projection of the distance passed over on the slope. Thereby the marking point is caused to trace a straight line when the machine travels over level ground, and a more or less inclined and irregular line when the machine travels over slopes, in which the abscissa of any point represents its horizontal distance from the starting point and its ordinate is proportional to the vertical elevation above the base line.

In use the machine is kept in an approximately vertical plane and propelled in an approximately straight line in the direction along which it is desired to take the profile. Owing to the absence of friction or resistance to the swinging of the pendulum frame, whereby the disk is caused to take positions corresponding exactly to the slope, the profiles, which are drawn rapidly, are also sufficiently accurate for ordinary surveying purposes.

I claim:

1. An apparatus for recording terrestrial profiles, comprising a motor disk, a record sheet drive, a tracing point drive, both operated by said motor disk, the latter being rotatable and also movable bodily about an axis other than that of its rotation, and means for swinging the disk about such axis when the apparatus as a whole is inclined.

2. A profile drawing apparatus comprising in combination a carriage, a swinging frame mounted upon said carriage on a pivotal axis perpendicular to the direction of progress of the carriage, a motor disk mounted upon said frame with its face perpendicular to said axis, gearing between the carriage and disk for rotating the latter when the carriage travels, a weight suspended from said frame for moving the latter and the disk correspondingly to inclinations assumed by the carriage, a record sheet feed, a marker, a means for feeding said marker over a record sheet in a direction in right angles to the feed of the sheet, a wheel geared to the record sheet feed for actuating the latter and arranged with its periphery in contact with the motor disk at a point in the line of the pivotal axis of said disk, and a second wheel connected with the marker feed and bearing against the motor disk at the center thereof, when the carriage is on level ground.

3. A profile tracing instrument including a disk, a frame on which said disk is mounted, said frame being oscillatively mounted on an axis perpendicular to the plane of said disk, means for swinging said frame about said axis through angles corresponding to angles of inclination of the instrument, means for driving said disk including a gear mounted upon such swinging frame and a gear mounted upon a relatively stationary part of the instrument, said gears having their engagement at a point in the line of said axis, a record sheet feeding wheel having peripheral contact with the face of said disk at a point in the line of said axis, and having the plane of its circumference perpendicular to a plane including the radius of the disk passing through the point of contact and a marker feeding wheel making peripheral contact with the disk and having its circumference in a plane passing through the same radius, when the instrument is on level ground.

4. A profile tracer comprising in combination with a paper feed roll, a friction wheel for driving the same, a marker, a second friction wheel for feeding said marker across the paper perpendicularly to the feed thereof, a motor disk having a face engaging the circumference of said wheels for driving the same frictionally, a weighted frame carrying said disk and adapted to swing through angles proportional to the inclinations of the instrument, and means for driving said disk, said disk being movable angularly with respect to said wheels in correspondence with the inclination of the instrument as a whole, so as to drive the first named wheel at a rate proportional to the co-sine of the angle of inclination, and the second wheel at a rate proportional to the sine of the angle of inclination.

5. An instrument for drawing profiles comprising essentially a base, a weighted frame oscillatively mounted on said base, a motor disk carried by said frame so as to be movable bodily upon oscillation thereof, a driving gear for rotating said disk mounted upon said base, a driven gear meshing with said driving gear and mounted upon said frame, a paper feed driving wheel making contact at its circumference with the face of said disk and supported by the base, said point of contact being in the axis of oscillation, whereby frictional resistance to swinging movement of the frame due to the wheel is nothing, and no linear movement of the disk occurs at the point of contact upon swinging movement thereof.

6. A profile tracing instrument comprising supporting means adapted to occupy inclinations corresponding to the inclinations of the surface of the ground on which it rests, feeding mechanism for a record sheet, a marker, feeding means for said marker arranged to move the same transversely to the direction of feed of the sheet, wheels connected with said feeding mechanism and feeding means respectively for actuating the same and being normally in unchanged positions with respect to the supporting means, a motor disk with which said wheels are in contact peripherally and by which they are driven, a weighted swinging frame having an axis other than that of the disk on which said disk is mounted and by which it is angularly moved relatively to the wheels, through angles proportional to the angles at which the instrument as a whole is inclined, and means for driving said disk at a rate proportional to the speed of travel of the instrument, the sheet feeding wheel being in the position of maximum driving ratio, and the marker feeding wheel of minimum driving ratio to the disk when the instrument is on level ground.

7. A profile tracer comprising record sheet feeding means, a marker, mechanism for moving said marker in a direction transverse to that in which the sheet is fed, said feeding means and moving mechanism each including a wheel as the primary element, a rotary motor disk having light frictional driving contact with the peripheries of both said wheels, a pendulum weighted holder on which said motor disk is mounted, a carriage on which said holder is pivoted on an axis other than the axis of rotation of the disk, and means for rotating the disk at a rate proportional to the speed of travel of the carriage.

In testimony whereof I have affixed my signature, in presence of two witnesses.

VANNEVAR BUSH.

Witnesses:
A. H. BROWN,
P. W. PEZZETTI.